US006576285B1

(12) United States Patent
Bader et al.

(10) Patent No.: US 6,576,285 B1
(45) Date of Patent: Jun. 10, 2003

(54) CHOLESTEROL LOWERING BEVERAGE

(75) Inventors: Primo Bader, Sarasota, FL (US); Stephen P. Fowler, Winter Haven, FL (US); Robert C. Lijana, Moorestown, NJ (US)

(73) Assignee: Sunpure Ltd., Lakeland, FL (US)

( * ) Notice: Subject to any disclaimer, the term of this patent is extended or adjusted under 35 U.S.C. 154(b) by 0 days.

(21) Appl. No.: 09/712,715

(22) Filed: Nov. 14, 2000

(51) Int. Cl.⁷ .............................. A23L 2/00; A23L 2/39
(52) U.S. Cl. ..................... 426/590; 426/601; 426/602; 426/611; 424/439
(58) Field of Search ................. 426/601, 611, 426/602, 590; 424/439

(56) References Cited

U.S. PATENT DOCUMENTS

| | | | | | |
|---|---|---|---|---|---|
| 5,929,062 A | * | 7/1999 | Haines | ......................... | 514/182 |
| 5,958,913 A | * | 9/1999 | Miettenen et al. | .......... | 426/804 |
| 6,025,348 A | * | 2/2000 | Goto et al. | ................. | 514/182 |
| 6,031,118 A | * | 2/2000 | van Amerongen et al. | . | 426/611 |
| 6,087,353 A | * | 7/2000 | Stewart et al. | ............... | 514/182 |
| 6,113,972 A | * | 9/2000 | Corliss et al. | ............... | 426/613 |
| 6,117,475 A | * | 9/2000 | van Amerongen et al. | . | 426/601 |
| 6,123,978 A | * | 9/2000 | Dartey et al. | ................ | 426/602 |
| 6,129,944 A | * | 10/2000 | Tiainen | ...................... | 426/577 |
| 6,139,897 A | * | 10/2000 | Goto et al. | .................. | 426/601 |
| 6,147,236 A | * | 11/2000 | Higgins | ....................... | 552/554 |
| 6,184,397 B1 | * | 2/2001 | Roden et al. | ................. | 552/200 |
| 6,190,720 B1 | * | 2/2001 | Yuan et al. | .................. | 428/601 |
| 6,231,915 B1 | * | 5/2001 | van Amerongen et al. | . | 426/611 |
| 6,242,001 B1 | * | 6/2001 | Bruce | .......................... | 424/464 |
| 6,274,574 B1 | * | 8/2001 | Alashe et al. | ................ | 426/601 |
| 6,326,050 B1 | * | 12/2001 | Goto et al. | ................... | 426/601 |

* cited by examiner

Primary Examiner—Carolyn Paden
(74) Attorney, Agent, or Firm—Arthur W. Fisher, III

(57) ABSTRACT

A beverage or pre-beverage emulsion and method for producing the beverage or pre-beverage emulsion formulated to provide a predetermined daily dosage of sterol or stanol esters comprising a combination of water and an emulsifier, and sterol or stanol esters in relative amounts by weights to produce an effective cholesterol-lowering benefit when consumed with cholesterol containing meals.

41 Claims, No Drawings

CHOLESTEROL LOWERING BEVERAGE

BACKGROUND OF THE INVENTION

1. Field of the Invention

A beverage or pre-beverage emulsion and method for producing the beverage or pre-beverage emulsion formulated with sterol or stanol esters.

2. Description of the Prior Art

Plant sterols or phytosterols and stanols are naturally occurring constituents of edible vegetable oils and as such are present in the human diet. The function of plant sterols and stanols in plants is similar to that of cholesterol in mammals; that is, the plant sterols and stanols are involved in membrane structure.

Beneficial effect of plant sterols in cholesterol-lowering was published as early as 1953 (Pollak, 1953). Numerous subsequent studies have confirmed the cholesterol-lowering effect. Moreover, the minimum required daily dosage for the desired result has since been determined.

In order to have a significant cholesterol-lowering effect, approximately one (1) gram per day of plant sterols should be consumed (Hendriks et al.,1999).

It is a well established demographic fact that coronary heart disease (CHD) is one of the major diseases for which the United States population is at significant risk. It is also widely recognized that serum cholesterol levels are linked to the risk of CHD in individuals. In an Interim Final Rule, 21 CFR Part 101, published on Sep. 8, 2000, the Food and Drug Administration (FDA) recognizes the cholesterol-lowering benefit of sterol/stanol esters, and allows certain health claims associated with the minimum dietary intake of sterol esters of 1.3 grams per day, taken twice per day at a level of 0.65 grams each time with meals or stanol esters of 3.4 grams per day, taken twice per day at a minimum level of 1.7 grams each time with meals.

It has been shown that the site of action for plant sterols and plant stanols is in the intestinal lumen where plant sterols/stanols, which closely resemble cholesterol in structure, act to interfere with the absorption of cholesterol across the intestinal mucosa. Specifically, the phytosterols block the absorption of cholesterol. Moreover, little of the plant sterol compounds are absorbed through the intestines, but are instead passed through the stool. Although people consume some plant sterols and stanols every day in their normal diet, most people do not consume enough sterols/stanols to achieve a significant cholesterol-lowering benefit.

It has been shown that plant sterols and stanols when ingested in the free or pure crystalline form have limited solubility in fats or water. Esterification of plant sterols and stanols with fatty acids produces a more fat soluble and useful form called sterol and stanol esters. Stanol esters are made by hydrogenating the sterol forms. These esterified forms of sterol/stanol are much more oil soluble and can more easily be included in fatty food applications. It has been claimed that phytosterols should be consumed in an emulsified and/or solubilized form to be effective when when delivered to the intestinal wall.

Applicant has found that with these esterified forms of phytosterols/stanols, a successful emulsion can be created, which can then be consumed in a typically low-fat beverage application, and yet would be delivering the phytosterols/stanols esterified into the preferred form.

U.S. Pat. Nos. 5,502,045 and 5,958,913 describe a process for making saturated β-sitostanol fatty acid esters for subsequent inclusion in the fatty portion of several foods that have a significant fat or oil content, such as rapeseed oil, other vegetable oils, mayonnaise, and margarine. However, the application possibilities for the saturated β-sitostanol esters in these patents focuses on those foods containing a significant fat percentage.

U.S. Pat. No. 5,892,068 relates to the production of discrete stanol/sterol esters using a food grade acid catalyst. This patent focuses on a synthetic route which can be transferred to large-scale production. The implication of this process is to provide tighter control over specific stanol/sterol esters including the specific fatty acid fractions they are joined to for a pharmaceutical application. The final dietary uses of the sterol/stanol esters through specific foods or beverages are not discussed.

U.S. Pat. No. 6,031,118 teaches a method for the production of hydrogenated stanol fatty acid esters and subsequent use in food products focusing on their use in foods with a significant fat content, with examples being 70% and 40% fat spreads, and high fat dressing. Once again, low fat beverages as a possible mode of dietary delivery of the sterol/stanol esters are not discussed.

U.S. Pat. No. 6,025,348 discloses fat compositions obtained by dissolving a phytosterol with polyhydric alcohol/fatty acid esters, each having a degree of esterification of 2 or higher, and containing at least one hydroxyl group remaining unesterified. The oil composition can then be used in foods with particular application in fat-processed foods. However, the phytosterol content in the example oils created is rather low due to the large amount of non-phytosterol oil used. The maximum amount of phytosterols present in all of the example oil mixtures is less than 5% phytosterol. This low level of phytosterol does not lend itself to low fat beverage delivery systems. Furthermore, the examples illustrate ingesting 10 grams of the mixtures as cooking oil, 10 grams of the oil mixtures as brioche (rolls), and 12 grams of the oil mixtures through french fries.

U.S. Pat. No. 6,113,972 shows to a phytosterol protein complex comprising phytosterols, an amount of protein (preferably defatted whole egg protein), and an amount of edible oil. The phytosterol constituent is esterified with triglycerides or other fatty acids. The complex includes other oils and a protein moiety to successfully emulsify a more pure form of the phytosterol. The dosage delivered is set at a minimum of 0.1 gram of phytosterol and more preferably 0.3 grams of phytosterol per serving of food product, which is well below the recommendation of the FDA. This phytosterol/oil/protein complex may be used in various foods. However, it is known that proteins of the type utilized are not soluble in acidified beverages and therefore limit the use to neutral pH beverages. This is because this type of protein coagulates in the lower pH range (below 4.5).

The emulsion system of Applicant's invention differs from U.S. Pat. No. 6,113,972 by using esterified phytosterols/stanols and not using a protein as a part of the emulsion matrix. Thus, the use is not restricted because of possible compatibility problems with the protein. This permits the use of the pre-beverage emulsion of Applicant's invention in all types of beverage pH ranges without special stabilization including the acid pH range lower than about 4.5, where almost all of the fruit flavored and juice containing beverages fall.

U.S. Pat. No. 6,087,353 relates to a process of condensing an aliphatic acid with one or more phytosterols to form a phytosterol ester and hydrogenating the phytosterol ester to form a hydrogenated phytosterol ester. The hydrogenated phytosterol esters may be used in a myriad of products including beverages by several possible delivery systems, including emulsions. The focus is specifically on delivering hydrogenated phytosterols because of the inherent improved stability to oxidation. However, it is not clear how an emulsion as a delivery vehicle would be constructed without examples of such. Further, no specific minimum dose of hydrogenated phytosterols is suggested.

SUMMARY OF THE INVENTION

The present invention relates to a beverage and pre-beverage emulsion comprising sterol/stanol esters for use in beverages. The invention also includes a method of producing the beverage or pre-beverage emulsion.

Currently no commercially available beverage has been enriched to provide an effective cholesterol-lowering beverage when regularly consumed. The present invention has been formulated to provide the minimum effective daily dose of sterol esters of 0.65 grams per serving twice daily for 1.3 grams per day or 1.7 grams of stanol esters per serving twice daily for 3.4 grams per day recognized by the Food and Drug Administration (FDA). Since plant sterol/stanol esters are not water soluble, the esters do not naturally dissolve into a low-fat aqueous system. However, the present invention provides a process to incorporate such plant sterol or stanol esters into a beverage matrix for beverage products containing a predetermined amount of either sterol or stanol esters per serving currently recommended by the FDA so as to obtain the cholesterol-lowering benefit when consumed with cholesterol containing meals.

It has been found that by first creating an aqueous pre-beverage emulsion matrix containing the plant sterol or stanol esters, it is possible to formulate ready-to-drink beverages or beverage syrups or concentrates containing plant sterol or stanol esters. Plant sterol or stanol esters can be included in the pre-beverage emulsion at a high enough level or concentration so that when the pre-beverage emulsion is used in a beverage formula at a diluted level, the beverage will contain an effective dose of plant sterol or stanol esters. Further, it has been found that the pre-beverage emulsion can also include a variety of other ingredients, both oil and water soluble, useful in the final beverage formulation comprising flavoring compounds, colors, juices and nutrients including fat-soluble vitamins such as tocopherols or vitamin E.

The beverage may comprise juice and fruit flavored drinks with up to 100% fruit juice, coffees and teas, carbonated drinks, nutritional drinks, frozen drink forms and even alcohol containing drinks.

Further processing of the pre-beverage emulsion by spray drying or other drying means permits Applicant's invention to be used in dry beverage mixes and other food applications such as dry gelatin mixes, dry cake mixes and similar forms.

When consumed with cholesterol containing meals, these beverages would drive increased compliance to healthy regimens as recommended by the FDA and other recognized authorization.

The invention accordingly comprises the features of construction, combination of elements, and arrangement of parts which will be exemplified in the construction hereinafter set forth, and the scope of the invention will be indicated in the claims.

DETAILED DESCRIPTION OF THE INVENTION

The present invention relates to a beverage or beverage syrup and process or method for producing the beverage and beverage syrup for the delivery of an effective amount or dose of cholesterol-lowering sterol or stanol esters. The Food and Drug Administration (FDA) recommends two daily doses of sterol esters of 0.65 grams each for a total of 1.30 grams daily or two daily doses of stanol esters of 1.7 grams each for a total of 3.4 grams daily as an effective amount for cholesterol-lowering when consumed with cholesterol containing meals.

Sterol/stanol esters are solid or semi-solid compounds which are not naturally miscible with aqueous solutions. As described more fully hereinafter, in order to produce a beverage containing an effective amount of sterol or stanol esters, an aqueous pre-beverage emulsion matrix containing the sterol or stanol esters is produced. The pre-beverage emulsion can then be effectively incorporated into beverage concentrates or syrups, which are, in turn, incorporated into beverages or formulated directly into ready-to-drink beverages.

The pre-beverage emulsion is prepared by two different phases: a water soluble phase which contains water soluble emulsifier(s) and an oil soluble phase which contains a predetermined amount of sterol or stanol esters, which are combined into the pre-beverage emulsion. Each of these two phases may include other functional ingredients as described hereinafter.

The water soluble phase contains water and at least one water soluble emulsifier such as gum arabic, pectins, xanthan gums, guar gums, locust bean gum (carob bean gum), cellulose gums, carrageenans, alginates, agar and modified starches. The preferred emulsifiers include arabic gum, pectins, guar gum, xanthan gum and/or modified starches. These water-based emulsifiers constitute from about 0.1 percent to about 55 percent of the total weight of the water soluble phase of the pre-beverage emulsion which translates to from about 0.1 percent to about 45 percent of the total pre-beverage emulsion.

The water soluble phase can also contain a preservative such as sodium benzoate and potassium sorbate to guard against microbiological spoilage which comprises from about 0.01 percent and to about 0.5 percent of the water soluble phase. When such a preservative is used, the water soluble phase is typically acidified to a pH of below about 4.0 by the addition of acceptable food grade acidulants such as citric acid. Acidifying the water soluble phase of the pre-beverage emulsion enhances the effective use of the preservatives against micro-organisms. Alternate methods of reducing or retarding the growth of micro-organisms may include the lowering the water activity, refrigerated storage or speciality packaging of the pre-beverage emulsion. Antioxidants such as ascorbic acid and rosmarinic acid (water soluble rosemary extract) can also be incorporated in the water soluble phase. The water soluble phase of the pre-beverage emulsion may contain other functional water soluble ingredients such as food grade colorants, fruit juices or juice concentrates, water soluble nutritive additives such as vitamin C, the B vitamins (especially Folic Acid, which some literature has indicated as another CHD lowering nutrient) and minerals such as soluble forms of calcium. The water soluble phase will comprise from about 60 percent and to about 99 percent by weight of he combined pre-beverage emulsion. Once all the water soluble and miscible ingredients re dissolved and/or mixed into the water soluble phase, the water soluble phase is heated to a temperature of from about 90 F. to about 200 F. Preferably, the temperature is from about 130 F. to about 160 F. before combining the water soluble phase and the oil soluble phase.

The oil soluble phase contains the sterol or stanol esters. Oil soluble antioxidant compounds such as tocopherols or compounds naturally found in Rosmarinus officinalis (Rosemary) such as camosic acid, carnosol, and 12-methoxy camosic acid may be added in the oil soluble phase to protect the sterol esters from oxidation, particularly since the fatty acid portion of the sterol/stanol ester is unsaturated. Oil soluble flavoring ingredients and other oil soluble functional ingredients such as vitamin E, vitamin A, vitamin D, and/or B-carotene can also be added to the oil soluble phase. The sterol/stanol esters comprise from about 20 percent to about 99 percent of the oil soluble phase, depending on the other oil soluble constituents added. The oil soluble phase is then heated to a temperature from about 90 F. to about 200 F. Preferably, the temperature is from about 130 F. to about 160 F., in order to melt or liquify the sterol/stanol esters, so that the entire oil soluble phase is blended into a uniform mixture.

The oil soluble phase and the water soluble phase are combined and mixed together maintaining the temperature from about 130 F. to about 160 F. The use of a high shear mixer can achieve some particle size reduction as a pre-homogenizing step prior to actual homogenizing. The combined mixture is then homogenized with a homogenizer at operating pressures from about 2000 psi to about 25,000 psi. Preferably, the homogenizing pressure is from about 8,000 psi to about 15,000 psi resulting in individual or discontinuous emulsified oil soluble phase particles of average diameter of less than about five microns and preferably less than about one micron within the continuous water soluble phase. As homogenizing pressure is increased, a concurrent reduction in oil soluble phase particle size is achieved. The emulsion is typically homogenized with more than one pass through a homogenizer for best results on particle size reduction. The homogenized emulsion is then rapidly cooled to ambient or refrigerated temperatures to protect the integrity of the resulting pre-beverage emulsion.

At this stage a dry form of the pre-beverage emulsion may be produced by using a process such as spray drying the matrix, freeze drying, vacuum drying and drum drying or by other processes which might require a subsequent milling type process to achieve proper particle size reduction, such as but not limited to a colloid mill. The dry form may, in addition to dry mix beverage applications, be used in fruit flavored dry mixes for making gelatin deserts, and cake mixes.

This pre-beverage emulsion can be easily incorporated into beverage formulas of all types. This would include ready-to-drink products as well as syrups or concentrates which are later diluted into the final beverage for consumption. The types of beverages include fruit flavored beverages with juice contents from 0% to 100% juice, tea and coffee drinks, carbonated drinks, nutritional formulations, and alcohol containing drinks. The amount of sterol or stanol esters in the pre-beverage emulsion and the desired serving size of the beverage would determine the level of the pre-beverage emulsion to be included in the beverage or syrup formulation to deliver at least the minimum required/recommended level of sterol or stanol esters per serving. This would include formulas using the pre-beverage emulsion up to 100% in the beverage in which case the pre-beverage emulsion is the beverage. The pre-beverage emulsion could be used in beverages covering the entire acceptable range of beverage pH, including acid beverages.

The resultant beverage is to be consumed with the meal containing cholesterol.

Several examples of pre-beverage emulsions are indicated below.

EXAMPLE I

Sterol Ester Pre-beverage Emulsion (Concentrate/Syrup)

| Ingredient | Percent by weight |
| --- | --- |
| Water Soluble Phase | |
| Water | 61.40 |
| Emulsifier | 22.00 |
| Oil Soluble Phase | |
| Sterol Esters (>98%) | 16.60 |

The pre-beverage emulsion of Example I should be used at 4.0 grams of emulsion per beverage serving to deliver a dose of 0.65 grams of sterol esters per serving.

EXAMPLE II

Orange Emulsion with Sterol Esters and Vitamin E (Concentrate/Syrup)

| Ingredient | Percent by weight |
| --- | --- |
| Water Soluble Phase | |
| Water | 47.74 |
| Sodium Benzoate | 00.10 |
| Potassium Sorbate | 00.05 |
| Gum Arabic | 24.00 |
| Citric Acid | 00.20 |
| Ascorbic Acid | 00.03 |
| Rosemary Extract (WS) | 00.20 |
| Coloring | 00.25 |
| Orange Juice concentrate, 64 BX | 22.90 |
| Oil Soluble Phase | |
| Sterol Esters (98%) | 11.10 |
| Orange flavor oils | 00.50 |
| dl alpha tocopherol acetate | 00.83 |

The pre-beverage emulsion of Example II delivers 0.65 grams of sterol esters and 50 IU of vitamin E per 6 grams of emulsion, so an eight ounce serving of beverage would need to have 6 grams of this emulsion. The orange juice concentrate in this pre-beverage emulsion would deliver a 20% orange juice claim in the beverage in an 8 ounce serving.

EXAMPLE III

Lemonade Flavor Emulsion with Sterol Esters, Vitamin E, and Folic Acid in the Water Soluble Phase, on Starch (Concentrate/Syrup)

| Ingredient | Percent by weight |
| --- | --- |
| Water Soluble Phase | |
| Water | 53.54 |
| Potassium Benzoate | 00.10 |
| Potassium Sorbate | 00.06 |
| Modified Starch | 16.00 |
| Ascorbic acid | 00.30 |

-continued

| Ingredient | Percent by weight |
| --- | --- |
| Lemon juice concentrate | 15.00 |
| Coloring | 00.15 |
| Oil Soluble Phase | |
| Sterol esters (98%) | 13.30 |
| Lemon flavor oils | 00.55 |
| dl alpha tocopherol acetate | 1.00 |

This pre-beverage emulsion delivers 0.65 grams of sterol esters and 50 IU of vitamin E per 5 grams of emulsion, so and eight ounce beverage serving would need to contain 5 grams of this pre-beverage emulsion.

EXAMPLE IV

Stanol Ester Pre-beverage Emulsion (Concentrate/Syrup)

| Ingredient | Percent by weight |
| --- | --- |
| Water Soluble Phase | |
| Water | 63.80 |
| Emulsifier | 22.00 |
| Oil Soluble Phase | |
| Stanol esters | 14.30 |

This stanol ester emulsion, when used at 12 grams per serving, will deliver 1.7 grams of stanol esters.

EXAMPLE V

Beverage (No Dilution)

| Ingredient | Percent by weight |
| --- | --- |
| Water Soluble Phase | |
| Water | 83.20 |
| Emulsifier | 5.0 |
| Sucrose | 11.0 |
| Acidulant | 00.3 |
| Flavor compounds | 00.1 |
| Color compounds | 00.1 |
| Oil Soluble Phase | |
| Sterol esters | 00.3 |

This product is consumed as the beverage and contains all the necessary ingredients (including sweetener) normally used to make a palatable beverage. An eight ounce beverage serving (240 grams) would deliver the required amount of sterol esters (0.65 grams).

It will thus be seen that the objects set forth above, among those made apparent from the preceding description are efficiently attained and since certain changes may be made in the above construction without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A beverage emulsion for use in the production of a cholesterol lowering beverage comprising water, at least one emulsifier and sterol esters in relative amounts by weight to effectively reduce cholesterol intake when consumed during a meal containing cholesterol wherein said beverage emulsion comprises at least about 60 percent water, at least about 20 percent emulsifier and at least about 15 percent sterol esters all by weight.

2. The beverage emulsion for use in the production of a cholesterol lowering beverage of claim 1 further includes a preservative.

3. The beverage emulsion for use in the production of a cholesterol lowering beverage of claim 2 wherein said preservative is selected from a group comprising sodium benzoate, potassium sorbate and mixtures thereof.

4. The beverage emulsion for use in the production of a cholesterol lowering beverage of claim 2 further includes an acidulant.

5. The beverage emulsion for use in the production of a cholesterol lowering beverage of claim 1 further includes an antioxidant.

6. The beverage emulsion for use in the production of a cholesterol lowering beverage of claim 5 wherein said antioxidant is selected from a group comprising ascorbic acid, rosmarinic acid, tocopherols and mixtures thereof.

7. The beverage emulsion for use in the production of a cholesterol lowering beverage of claim 1 further including a preservative selected from a group comprising sodium benzoate, potassium sorbate and mixtures thereof.

8. The beverage emulsion for use in the production of a cholesterol lowering beverage of claim 7 further includes an acidulant.

9. The beverage emulsion for use in the production of a cholesterol lowering beverage of claim 1 further including an antioxidant selected from a group comprising ascorbic acid, rosmarinic acid, tocopherols and mixtures thereof.

10. The beverage emulsion for use in the production of a cholesterol lowering beverage of claim 1 further includes tocopherol.

11. A beverage emulsion for use in the production of a cholesterol lowering beverage comprising water, at least one emulsifier and sterol esters in relative amounts by weight to effectively reduce cholesterol intake when consumed during a meal containing cholesterol wherein said beverage emulsion comprises at least about 40 percent water, at least about 20 percent emulsifier, at least about 15 percent flavor or juice and at least about 10 percent sterol esters all by weight.

12. The beverage emulsion for use in the production of a cholesterol lowering beverage comprising water, at least one emulsifier and stanol esters in relative amounts by weight to effectively reduce cholesterol intake when consumed during a meal containing cholesterol wherein said beverage emulsion comprises at least about 80 percent water, at least about 5 percent emulsifier, at least about 10 percent flavor or juice and at least about 0.3 percent stanol esters all by weight.

13. The beverage emulsion for use in the production of a cholesterol lowering beverage of claim 12 wherein said emulsifier is selected from a group comprising arabic gums, pectins, xanthan gums, guar gums, locust bean gums, cellulose gums, carrageenans, alginates, agar, modified starches and mixtures thereof.

14. The beverage emulsion for use in the production of a cholesterol lowering beverage of claim 12 further including a preservative is selected from a group comprising sodium benzoate, potassium sorbate and mixtures thereof.

15. The beverage emulsion for use in the production of a cholesterol lowering beverage of claim 14 further includes an acidulant.

16. The beverage emulsion for use in the production of a cholesterol lowering beverage of claim 14 further including an antioxidant selected from a group comprising ascorbic acid, rosmarinic acid, tocopherols and mixtures thereof.

17. A beverage comprising at least about 80 percent water, at least about 5 percent emulsifier and at least about 0.3 percent sterol esters all by weight to effectively reduce cholesterol intake when consumed during a meal containing cholesterol wherein said emulsifier is selected from a group comprising arabic gums, pectins, xanthan gums, guar gums, locust bean gums, cellulose gums, carrageenans, alginates, agar, modified starches and mixtures thereof.

18. The beverage of claim 17 further including a preservative is selected from a group comprising sodium benzoate, potassium sorbate and mixtures thereof.

19. The beverage of claim 18 further includes an acidulant.

20. The beverage of claim 17 further including an antioxidant selected from a group comprising ascorbic acid, rosmarinic acid, tocopherols and mixtures thereof.

21. A beverage comprising at least about 80 percent water, at least about 5 percent emulsifier and at least 0.3 percent sterol esters all by weight to effectively reduce cholesterol intake when consumed during a meal containing cholesterol, said emulsifier is selected from a group comprising arabic gums, pectins, xanthan gums, guar gums, locust bean gums, cellulose gums, carrageenans, alginates, agar, modified starches and mixtures thereof.

22. The beverage of claim 21 further including a preservative is selected from a group comprising sodium benzoate, potassium sorbate and mixtures thereof.

23. The beverage of claim 22 further includes an acidulant.

24. The beverage of claim 21 further including an antioxident selected from a group comprising asorbic acid, rosmarinic acid, tocopherols and mixtures thereof.

25. A method for producing a cholesterol lowering beverage comprising the following steps:
   (1) producing a water soluble phase by dissolving at least one water soluble emulsifier in water, said emulsifier is selected from a group comprising arabic gums, pectins, xanthan gums, guar gums, locust bean gums, cellulose gums, carrageenans, alginates, agar, modified starches and mixtures thereof,
   (2) heating the water soluble phase to a first predetermined temperature,
   (3) producing an oil soluble phase by heating a sterol ester to a second predetermined temperature,
   (4) combining the water soluble phase and the oil soluble phase, and
   (5) homogenizing the combination of water soluble phase and oil soluble phase at a predetermined pressure, said predetermined pressure is from about 2,000 psi to about 25,000 psi.

26. The method of claim 25 wherein said first predetermined temperature is from about 90 F. to about 200 F.

27. The method of claim 26 wherein said second predetermined temperature is from about 90 F. to about 200 F.

28. The method of claim 25 wherein said first predetermined temperature and said second predetermined temperature are maintained when the water soluble phase and oil soluble phase are combined.

29. The method of claim 25 wherein said first predetermined temperature is from about 130 F. to about 160 F.

30. The method of claim 29 wherein said second predetermined temperature is from about 130 F. to about 160 F.

31. The method of claim 30 wherein said first predetermined temperature and said second predetermined temperature are maintained when the water soluble phase and oil soluble phase are combined.

32. A method for producing a cholesterol lowering beverage comprising the following steps:
   (1) producing a water soluble phase by dissolving at least one water soluble emulsifier in water, said emulsifier is selected from a group comprising arabic gums, pectins, xanthan gums, guar gums, locust bean gums, cellulose gums, carrageenans, alginates, agar, modified starches and mixtures thereof,
   (2) heating the water soluble phase to a first predetermined temperature,
   (3) producing an oil soluble phase by heating a sterol ester to a second predetermined temperature,
   (4) combining the water soluble phase and the oil soluble phase, and
   (5) homogenizing the combination of water soluble phase and oil soluble phase at a predetermined pressure, said predetermined pressure is from about 8,000 psi to about 15,000 psi.

33. A method for producing a cholesterol lowering beverage comprising the following steps:
   (1) producing a water soluble phase by dissolving at least one water soluble emulsifier in water, said emulsifier is selected from a group comprising arabic gums, pectins, xanthan gums, guar gums, locust bean gums, cellulose gums, carrageenans, alginates, agar, modified starches and mixtures thereof,
   (2) heating the water soluble phase to a first predetermined temperature,
   (3) producing an oil soluble phase by heating a sterol ester to a second predetermined temperature, said first predetermined temperature is from about 90 F. to about 200 F., said second predetermined temperature is from about 90 F. to about 200 F. and said predetermined pressure is from about 2,000 psi to about 25,000 psi,
   (4) combining the water soluble phase and the oil soluble phase, and
   (5) homogenizing the combination of water soluble phase and oil soluble phase at a predetermined pressure.

34. The method of claim 33 wherein said first predetermined temperature and said second predetermined temperature are maintained when the water soluble phase and oil soluble phase are combined.

35. A method for producing a cholesterol lowering beverage comprising the following steps:
   (1) producing a water soluble phase by dissolving at least one water soluble emulsifier in water, said emulsifier is selected from a group comprising arabic gums, pectins, xanthan gums, guar gums, locust bean gums, cellulose gums, carrageenans, alginates, agar, modified starches and mixtures thereof,
   (2) heating the water soluble phase to a first predetermined temperature,
   (3) producing an oil soluble phase by heating a sterol ester to a second predetermined temperature, said first predetermined temperature is from about 130 F. to about 160 F., said second predetermined temperature is from about 130 F. to about 160 F. and said predetermined pressure is from about 8,000 psi to about 15,000 psi, (4) combining the water soluble phase and the oil soluble phase, and (5) homogenizing the combination of water soluble phase and oil soluble phase at a predetermined pressure.

36. The method of claim 35 wherein said first predetermined temperature and said second predetermined temperature are maintained when the water soluble phase and oil soluble phase are combined.

37. A method for producing a dry particle food stuff for use in a cholesterol lowering food or beverage comprising the following steps:
   (1) producing a water soluble phase by dissolving at least one water soluble emulsifier in water,
   (2) heating the water soluble phase to a first predetermined temperature, said emulsifier is selected from a group comprising arabic gums, pectins, xanthan gums, guar gums, locust bean gums, cellulose gums, carrageenans, alginates, agar, modified starches and mixtures thereof,
   (3) producing an oil soluble phase by heating a sterol ester to a second predetermined temperature,
   (4) combining the water soluble phase and the oil soluble phase,
   (5) homogenizing the combination of water soluble phase and oil soluble phase at a predetermined pressure, and
   (6) drying the homogenized combination of water soluble phase and oil soluble phase.

38. The method of claim 37 wherein said first predetermined temperature is from about 130 F. to about 160 F., said second predetermined temperature is from about 130 F. to about 160 F. and said predetermined pressure is from about 8,000 psi to about 15,000 psi.

39. The method of claim 38 wherein said first predetermined temperature and said second predetermined temperature are maintained when the water soluble phase and oil soluble phase are combined.

40. The method of claim 37 wherein the individual emulsion oil soluble phase particles are homogenized to an average diameter of less than about five microns.

41. The method of claim 37 wherein the diameter of the individual homogenized emulsion oil soluble phase particles is less than about one micron.

* * * * *